(12) United States Patent
Roitblat

(10) Patent No.: US 6,189,002 B1
(45) Date of Patent: Feb. 13, 2001

(54) PROCESS AND SYSTEM FOR RETRIEVAL OF DOCUMENTS USING CONTEXT-RELEVANT SEMANTIC PROFILES

(75) Inventor: Herbert L. Roitblat, Honolulu, HI (US)

(73) Assignee: Dolphin Search, Honolulu, HI (US)

( * ) Notice: Under 35 U.S.C. 154(b), the term of this patent shall be extended for 0 days.

(21) Appl. No.: 09/457,190

(22) Filed: Dec. 8, 1999

Related U.S. Application Data

(60) Provisional application No. 60/112,036, filed on Dec. 14, 1998.

(51) Int. Cl.[7] .................................................... G06F 17/30
(52) U.S. Cl. ...................................... 707/1; 707/5; 706/15
(58) Field of Search ............................... 707/1, 3, 5, 532, 707/4, 6, 202, 531; 706/15, 16, 25; 704/9, 231

(56) References Cited

U.S. PATENT DOCUMENTS

| | | | |
|---|---|---|---|
| 5,325,298 | * 6/1994 | Gallant ...................................... | 704/9 |
| 5,619,709 | * 4/1997 | Caid et al. ............................ | 707/532 |
| 5,774,845 | * 6/1998 | Ando et al. ........................... | 704/231 |
| 6,006,221 | * 6/2000 | Liddy et al. ............................... | 707/5 |
| 6,076,088 | * 6/2000 | Paik et al. ................................ | 707/5 |

OTHER PUBLICATIONS

Carlson et al., "A cognitively–based neural network for determining paragraph coherence", IJCNN91, pp. 1303–1308, Nov. 1991.*

Scheler, "Extracting semantic features from unrestricted text", WCNN96, p. 499, Sep. 1996.*

* cited by examiner

*Primary Examiner*—Hosain T. Alam
*Assistant Examiner*—Sanjiv Shah
(74) *Attorney, Agent, or Firm*—Lieberman & Nowak, LLP

(57) ABSTRACT

A process and system for database storage and retrieval are described along with methods for obtaining semantic profiles from a training text corpus, i.e., text of known relevance, a method for using the training to guide context-relevant document retrieval, and a method for limiting the range of documents that need to be searched after a query. A neural network is used to extract semantic profiles from text corpus. A new set of documents, such as world wide web pages obtained from the Internet, is then submitted for processing to the same neural network, which computes a semantic profile representation for these pages using the semantic relations learned from profiling the training documents. These semantic profiles are then organized into clusters in order to minimize the time required to answer a query. When a user queries the database, i.e., the set of documents, his or her query is similarly transformed into a semantic profile and compared with the semantic profiles of each cluster of documents. The query profile is then compared with each of the documents in that cluster. Documents with the closest weighted match to the query are returned as search results.

18 Claims, 6 Drawing Sheets

PROCESS AND SYSTEM FOR RETRIEVAL OF DOCUMENTS USING CONTEXT-RELEVANT SEMANTIC PROFILES

CROSS REFERENCE TO RELATED APPLICATION

This application claims the priority benefits of copending U.S. Provisional Application No. 60/112,036, filed on Dec. 14, 1998.

FIELD OF THE INVENTION

This invention relates to computer-based document search and retrieval. It provides a computational means for learning semantic profiles of terms from a text corpus of known relevance and for cataloging and delivering references to documents with similar semantic profiles.

BACKGROUND

The number of documents contained in computer-based information retrieval systems is growing at tremendous rates. For example, the world wide web is thought to contain more than 800 million documents already. People looking for specific information in that sea of documents are often frustrated by two factors. First, only a subset of these documents is indexed and, second, of those that are indexed, many are indexed ambiguously. The present invention does not address directly the first limitation of document retrieval, but this limitation nonetheless plays a role in addressing the second limitation.

The main method currently used for document retrieval is keyword or free-text search. A user enters a search query consisting of one or a few words or phrases and the system returns all of the documents that have been indexed as containing those words or phrases. As more documents are indexed, more documents are expected to contain the specified search terms. For example, one world wide web search engine recently returned more than 755,000 documents in response to a query for the word "pitch." Adding the word "shot" to the query resulted in 797,000 documents. These large quantities of documents cannot be usefully examined by the user, and there is no guarantee that the desired information is contained by any of them. Increasing the likelihood that a search using such a system will retrieve a desired document necessarily demands decreasing the specificity of the search.

Furthermore, many of the documents retrieved in a standard search are irrelevant to a user's needs because these documents use the searched-for terms in a way different from that intended by the user. Human word use is characterized by polysemy. Words have multiple meanings. One dictionary, for example, lists more than 50 definitions for the word "pitch." We generally do not notice this ambiguity in ordinary usage because the context in which the word appears allows us to pick effortlessly the appropriate meaning of the word for that situation.

Human language use is also characterized by synonymy. Different words often mean about the same thing. "Elderly," "aged," "retired," "senior citizens," "old people," "golden-agers," and other terms are used, for example, to refer to the same group of people. A search for one of these terms would fail to select a document if the author had used a different synonym. Psychological studies have shown that people are generally poor at remembering which specific words were used earlier to express an idea, preferring instead to remember the gist of the passage.

Current search engines use Boolean operators to try to address these problems, but most nontechnical users do not seem either to know or use Boolean operators. A study of actual searches submitted to the Alta Vista search service found that 80% of searches employed no operators whatever. See Craig Silverstein et al., *Analysis of a Very Large Alta Vista Query Log*, SRC TECHNICAL NOTE, 1998-014 (Oct. 26, 1998). Another way that users could solve these problems is to include enough terms in a query to disambiguate its meaning or to include the possible synonyms that the document's author might have used. Again, people do not seem inclined to use such strategies in that the average number of terms entered in a query was found to be just over 2.0, and two-thirds of all queries employed two or fewer search terms. Perhaps one reason for this is that adding additional terms typically changes the order in which page links are displayed for the user. Another reason may be that additional terms often increase the number of documents that are retrieved.

OBJECT OF THE INVENTION

The object of the invention is to provide a method for document search in a defined context, so as to obviate the problems related to polysemy and synonymy, and focus the search on documents relevant to the context.

SUMMARY OF THE INVENTION

This invention provides means for context-relevant document retrieval that preferentially returns items that are relevant to a user's interests. According to one aspect of the invention, it learns the semantic profiles of terms from a training body or corpus of text that is known to be relevant. A neural network is used to extract semantic profiles from the text of known relevance. A new set of documents, such as world wide web pages obtained from a keyword search of the Internet, is then submitted for processing to the same neural network, which computes a semantic profile representation for these pages using the semantic relations learned from profiling the training documents. According to another aspect of the invention, these semantic profiles can be organized into clusters, i.e., groups of points in a multi-dimensional space forming relatively close associations, in order to minimize the time required to answer a query. When a user queries the database, his or her query is similarly transformed into a semantic profile and compared with the semantic profiles of each cluster of documents. The query profile is then compared with each of the documents in that cluster. Documents with the closest weighted match to the query are returned as search results.

BRIEF DESCRIPTIONS OF THE DRAWINGS

DETAILED DESCRIPTION OF THE INVENTION

The present invention uses the context in which words appear as part of the representation of what those words mean. Context serves to disambiguate polysemous words and serves to extract the commonality among synonymous word use, because synonyms tend to occur in the same context. The system extracts these meaningful relationships using brain-style computational systems as implemented in artificial neural networks (or isomorphic statistical processes). It then retrieves documents that are specifically relevant to the words used in the search query as those words are used in a specific context. When searching for documents in a "golf" context, the word "pitch," for example, will have a different meaning than when searching in a "music" context. In the golf context, documents relevant to musical pitch would simply be clutter.

The context for the system comes from the analysis of a body of text, called a base text or a text corpus, that is representative of the interests of a particular community, as a guide to interpreting the words in their vocabulary, i.e., the aggregate of words in the text corpus. The editors of a magazine, for example, know what their readers want to know about. They have established a vernacular of communication with their audience. Their readers, in turn, have evolved a transparent conceptual framework for this material, categorizing things partially on the basis of the conventions established by the editors and partially on the basis of their own unique perspectives. When they search, they want their results to match these conceptual frameworks. Similarly, the documents written by a corporation or another group also employ a specialized vocabulary and a consensual interpretation of those terms. Texts such as these could also serve as base texts for this system.

This invention uses a corpus of texts with a single point of view to train a neural network to extract the context-specific meaning of the terms appearing in the corpus. For example, to learn about golf-related terms, the system would process a series of documents known to be about golf, such as those appearing in a golfing magazine. Other specialty magazines, or more generally, other texts that are produced either by or for a specific community could similarly be used to train the network to learn other contexts. A user searching from a golf-related context would then be offered preferentially golf-related documents. A user employing a search engine trained on musical materials would then preferentially be offered music-related documents in response to a search query.

Figure 1:
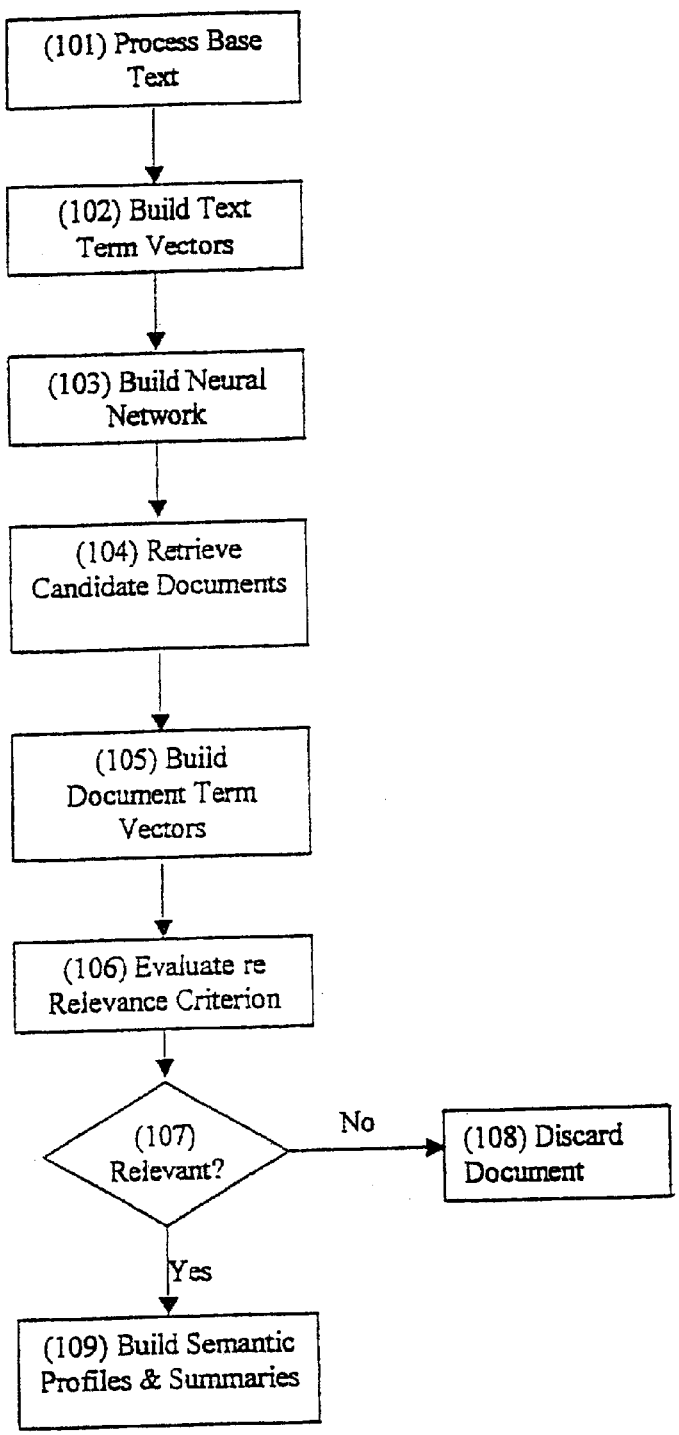
FIG. 1 is a block diagram showing the basic steps of the process of building and training a neural network, and of evaluating the semantic profiles of the documents searched.

The first three steps of FIG. 1 illustrate the sequence of steps employed by the invention in processing a text of known relevance, i.e., the base text or text corpus, to extract its vocabulary and semantic patterns (101, 102, 103). This text might consist of a set of articles published in a book or special interest magazine for some period of time, e.g., six months to a year. It could alternatively be any body of text produced either by or for a community such as a chat group, industry organization, corporation, or field of scholarship. This text provides a coherent view of the document collection from the perspective of the community. The ranges of word meanings in the text are relatively constrained compared to their general use in all texts; thus, the ambiguity of the terms is reduced substantially.

Figure 2:
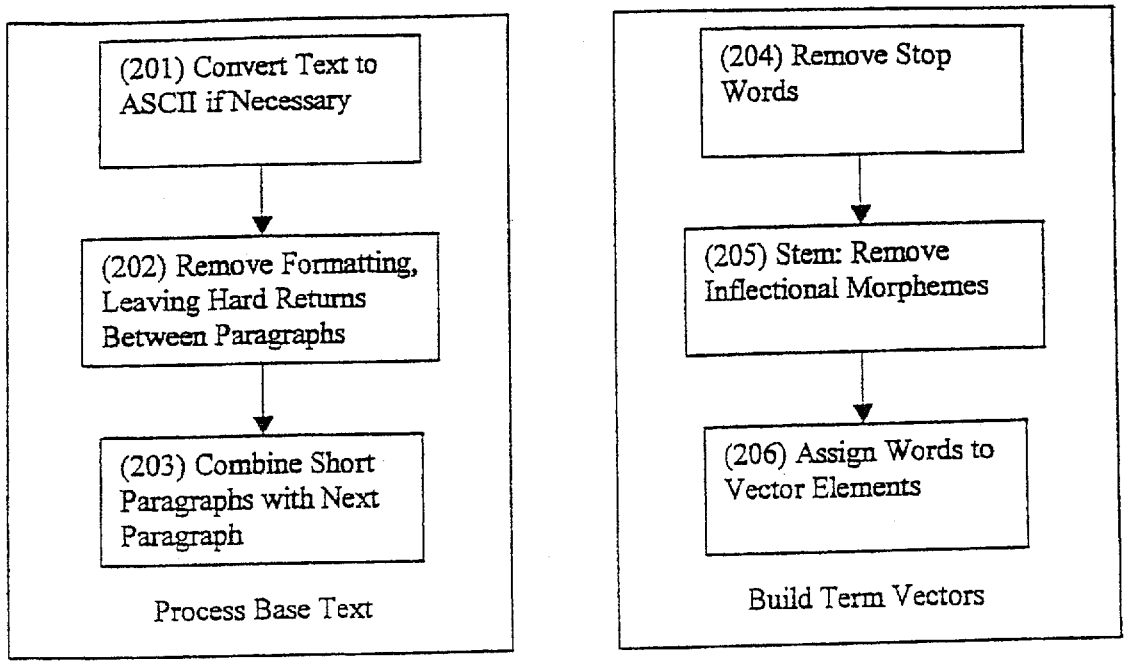
FIG. 2 shows a more detailed block diagram of the steps used to process the base text and those used to build the term vectors.

Step 101, processing the text, is detailed on the left side of FIG. 2 (201, 202, 204). First, the text is converted to ASCII (201), if necessary. Then, formatting is removed from the text, leaving hard-returns to mark the ends of complete paragraphs (202). Finally, short paragraphs (e.g., paragraphs of fewer than five words) are combined with the subsequent paragraphs (203).

The second step (102) is to convert the text into term vectors. As in many other information-retrieval systems, so-called stop words—such as "a," "an," "the," and other very common words—are removed from the vocabulary (204). Also removed are certain inflectional morphemes (205). For example, "trained" is transformed to "train" by removing the past-tense morpheme "-ed," "government" is reduced to "govern," and so forth.

Stop words are among the most common words in the language. Their role is to provide grammatical structure to the sentence, rather than to contribute substantially to the meaning of the text. Commonly, several hundred stop words are used in database search applications. The current instantiation of the invention includes 379 stop words, listed in Appendix A, but the number is not critical. Having more or fewer stop words affects the efficiency of storage and computation, without changing the overall strategy of the process.

Similarly, inflectional morphemes add little to the basic meaning of the words in the sentence. The inflections function primarily to signal grammatical roles. As one example, note that changing "govern" to "government" transforms the word from a verb to a noun, but does not change its underlying meaning. The removal of inflections, or "stemming," is common in many database retrieval applications. The list of unique words in the text (i.e., all of the word stems with inflections and stop words removed) forms the vocabulary of the text. The length of this list is K.

Once the vocabulary size has been determined, the next step is to build the input vectors (206), Each element in the vector corresponds to a unique word in the vocabulary. For example, if the text corpus uses 10,000 different words, then the input vector would consist of 10,000 elements. Table 1 shows some examples of words and their index numbers.

TABLE 1

Example words and their index into the text vector.

| Word | Index |
| --- | --- |
| dominoes | 1640 |
| domino | 1640 |
| expand | 1940 |
| expands | 1940 |
| richardson | 5541 |
| gynecologist | 7018 |
| sase | 9960 |

Figure 3:
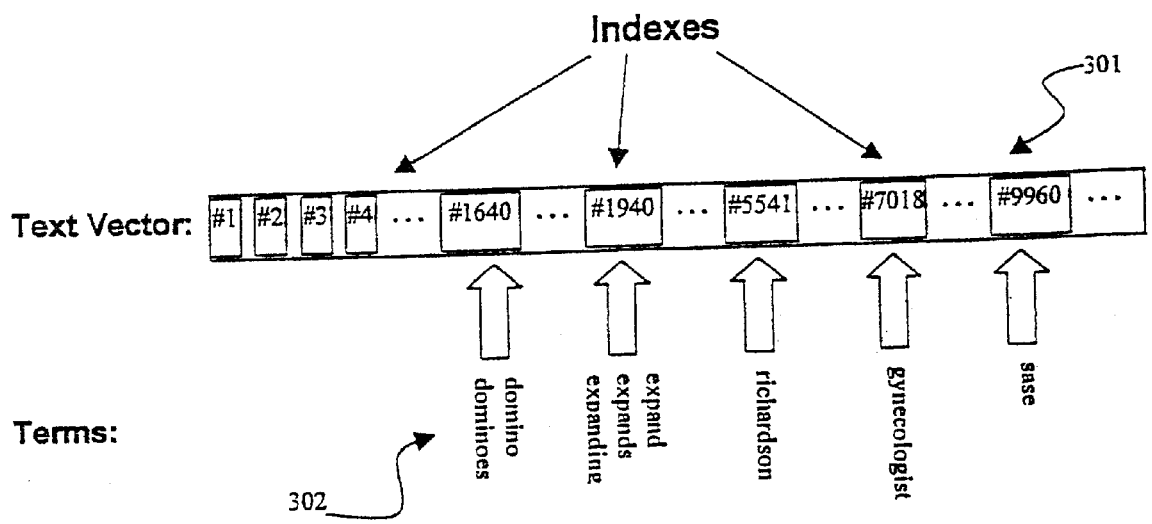
FIG. 3 shows an example of a text vector that illustrates how words are represented by the vector; it also shows examples of word stemming.

FIG. 3 shows a schematic of a text vector and a few of the words that go into it. The ordering of the words is constant but arbitrary. Element number 1640 is nonzero whenever the word "domino" or "dominoes" appears in the text being processed. Both of these words point to the same element in the text vector because "domino" is the stem for "dominoes." This pair, as well as the set "expand," "expands," and "expanding," illustrates the effect of stemming—multiple forms constitute only a single unique word entry. We may wish keep track of the various forms even when they do not point to unique vector elements, because this makes computing the vector representation for real texts more efficient. We could, without loss of generality, remove all except the stem forms from the mapping, but then we would have to stem explicitly each word every time it was encountered. Notice that all words are lower case, again to improve computational efficiency. The word "richardson" is included because it appeared in the text. Although not technically a word, "sase" is included in the vector because it was a frequently used letter string in the text, it has a specifiable meaning, and there is no advantage to omitting it.

The number of unique words grows only slowly with the size of the corpus. According to Zipf's law, the frequency of occurrence of a word is a decreasing logarithmic function of the rank of the word, so doubling the size of a corpus of words would add only a small fraction to the number of different words used. See ZIPF, G. K., THE PSYCHO-BIOLOGY OF LANGUAGE, (Houghton Mifflin 1935).

One text vector is produced for each paragraph. The paragraphs that are used are those that occur naturally in the text, except that very short paragraphs—titles, for example—are combined with the subsequent text paragraphs. The size of these paragraphs is not critical, provided that they are each more than a few words long. Paragraphs tend to be about a single topic and they tend to use the words in them in the same way. It would be rare, for example, to find a paragraph that used the word "pitch" in both its golf and its musical sense. For each word in the paragraph, the vector element corresponding to that word is increased. It may be preferable to limit each vector element to some maximum value, or, more generally, to convert the count of each word to the corresponding vector element through some mathematical function. Vector elements corresponding to words not present in the paragraph are set to zero. These vectors are then used to train the neural network.

Each input vector is presented to a neural network typically consisting of three layers of units (103). The input layer receives the input text vectors, the output layer produces a corresponding output or result vector, and the middle hidden layer intervenes between the input and output layers. The weights of the connections between each hidden unit and the elements of the input vector are adjusted according to a version of the Hebbian learning rule so that the input pattern is reproduced on the output units with minimum error. The network learns the general profile by which each word is used over all of the paragraphs in which it appears. As a result, the hidden units come to encode a summary of the relationships among the elements of the input vectors. This summary reflects the disambiguating effects of the context in order to deal with polysemy. It also reflects the shared meanings of words that appear in approximately the same context, in order to deal with synonymy. After training, the activation patterns of the hidden units following an input vector are taken to be a semantic profile of the text unit that produced the input vector. We can think of the elements of the hidden layer as representing a set of unnamed semantic primitives representing the words (in context) on which it was trained. No effort is made to label these semantic primitives.

Once the network has been trained and the semantic profiles of each of the input paragraphs have been learned, the set of documents in the document base is processed through the same neural network to obtain semantic profiles for each document. These documents could be pages retrieved from the world wide web.

Documents are retrieved (FIG. 1, 104) and converted to text vectors—one vector for each document (FIG. 1, 105). The inflections are removed according to the same rules used to process the original text. Optionally, the stop words are removed as well. Words in the documents that are not in the original text are counted, but otherwise ignored. The terms are weighted using inverse document frequency (the number of documents that contain the word, meaning that more common words, i.e., those that appear in more documents, are weighted less than words that appear in only a few documents. They are also weighted by the inverse length of the document—the longer the document, the more frequently words can appear in it, and this bias needs to be removed.

These vectors are then submitted to the neural network and the ability of the neural network to reproduce the document text vectors is assessed. If the cosine (the normalized dot product) between the document's original text vector and the output of the neural network is above a certain criterion, then the document is kept and stored in the database (FIG. 1, 106). If the cosine is below the criterion, then the document is discarded as irrelevant (FIG. 1, 108). An additional inclusion criterion involves the ratio of the number of words contained in the document that are in the vocabulary to the number of document words that are not contained in the vocabulary. Ratios below an empirically determined threshold also indicate an irrelevant document. Finally, documents are rejected if they contain more than a certain number of characters, because such lengths usually indicate that the document is a digest of a large number of only weakly related items, such as want-ads or email archives. Such documents are too long and contain too many different kinds of items to be useful. We have empirically found that a good maximum length limit is 250,000 characters.

The text vectors of those documents that pass the relevance tests are submitted to the neural network as input and the hidden unit activation pattern is used as a semantic profile of the page (FIG. 1, 109).

Each document's identification information (e.g., its URL), its semantic profile, a brief summary of the document, and any other pertinent information are added to the collection of relevant documents. This collection can be stored on a server or on any other accessible computer, including the user's computer.

Figure 4:
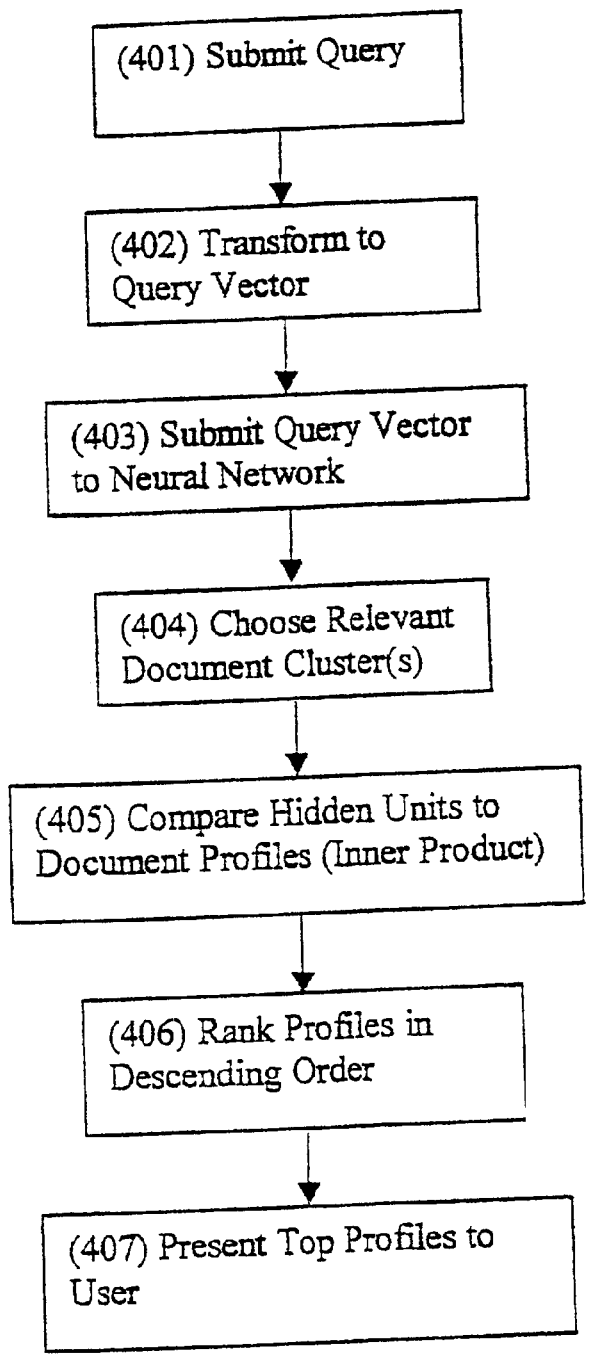
FIG. 4 shows the steps of processing a user's a query by the system.
Figure 5:
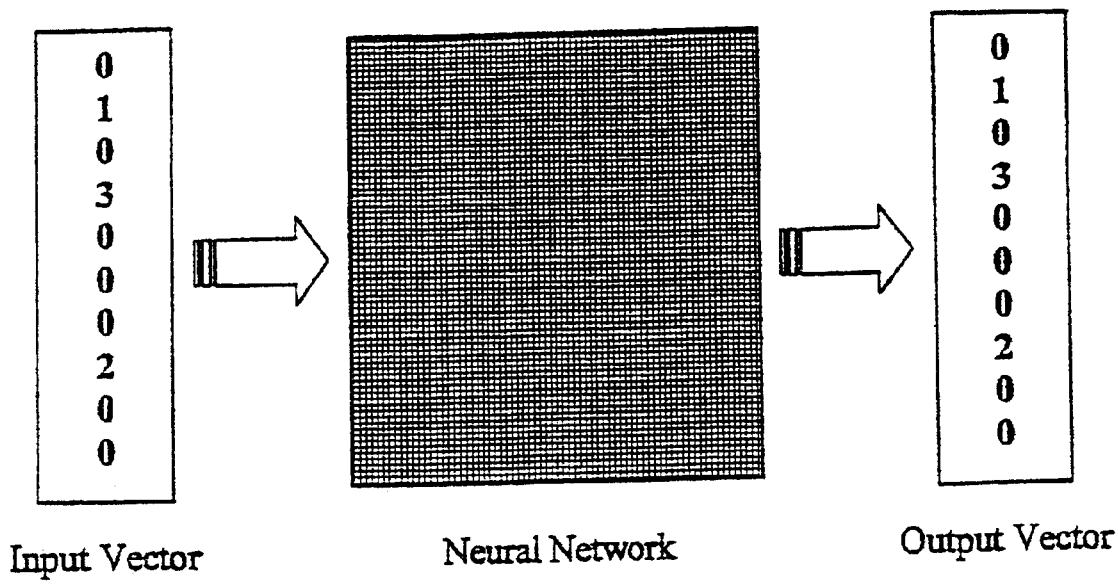
FIG. 5 shows the outline of the neural network system used to compute the semantics of the words in their specific training context; it shows how the network can be used to estimate result vectors given a selected input text vector.

A user query (FIG. 4, 401) is processed through the same neural network to produce its semantic profile (FIG. 4, 402, 403). Each word in the query is entered into the text vector and this vector is then fed to the neural network. The pattern of activation of the hidden units represents a semantic profile of the search terms. It is then a simple matter to compare the semantic profile of the search terms against the semantic profiles of each stored page (FIG. 4, 405). The pages that match most closely are the most relevant to the search and should be displayed first for the user.

In order to speed up searching the database, the profiles for each of the cached documents can be organized into clusters using either self-organizing feature map neural networks or the equivalent K-means clustering statistical procedure. See TEUVO KOHONEN, SELF-ORGANIZATION AND ASSOCIATIVE MEMORY, ($2^{nd}$ ed. Heidelberg Springer-Verlag 1988); Teuvo Kohonen, *Self-Organized Formation of Topologically Correct Feature Maps*, 43 BIOLOGICAL CYBERNETICS 59–69 (1982); HELGE RITTER, SELF-ORGANIZING FEATURE MAPS: KOHONEN FEATURE MAPS, in BRAIN THEORY AND NEURAL NETWORKS 846–851, (Michael A. Arbib ed., MIT Press 1995). (The information disclosed by the last of these sources is hereby incorporated by reference as if fully set forth herein.) Clustering takes advantage of the fact that vectors can be conceptualized as points in a high-dimensional space, one dimension corresponding to each element in the semantic profile. The proximity of one vector to another corresponds to the similarity between the two vectors, obtained using the dot product of the two vectors. These techniques arrange the set of semantic profiles into clusters such that every member of the cluster is closer to the centroid of its cluster than it is to the centroids of any of the other groups. As a result, we can limit the number of comparisons that have to be made between the query profile and the cached document profiles to just those that are in the cluster with the best match to the query profile (FIG. 4, 404). If an insufficient number of documents is returned from the first cluster (e.g., fewer than 50), or if their similarity is unusually low (e. g., below 0.3), additional clusters can be processed in order of decreasing similarity between the query vector and the cluster centroid. Additional weighting functions can be used, for example to penalize a document for having terms that are not contained in the vocabulary.

The user receives a list of documents in which the most pertinent documents are listed first (FIG. 4, 406, 407). The user can then click on one of the list items and the computer will retrieve the relevant document.

Preferred Embodiments

Two embodiments are described below in detail. Additional embodiments using alternative neural networks are also briefly mentioned.

PCA Network Embodiment

The first embodiment to be described is based on a neural network that extracts the principal components from the co-occurrence matrix. As shown in FIG. 1, the base text (the text corpus) is pre-processed to remove all formatting and all hard return characters except those between paragraphs (step 101). Very short paragraphs, such as titles are combined with the subsequent paragraphs.

A dictionary (vocabulary) is created that maps word forms and their uninflected stems to elements in a text vector (step 102). The number of unique entries is counted to give the length of the text vector (K), which is set to the number of unique words in the base text. One text vector of length K is constructed for each paragraph of the base text and these vectors are presented to the neural network (step 103) for learning (training).

In this embodiment, the network implements a principal components analysis of the collection of text vectors. This analysis reduces the data representation from a set of sparse vectors with length K to a collection of reduced vectors with length N. It projects the original data vectors onto another set of vectors eliminating the redundancy, i.e., the correlation, among the elements of the original vectors.

The first principal component is given by $$y_1 = \sum_{k=1}^{K} w_{k1} x_k = w_1^T x,$$

where $y_1$ is the first principal component, $x_1, \ldots, x_K$ are the K elements of vector x, and $w_{11}, \ldots, W_{K1}$ are the K elements of the corresponding connection weight vector. Superscript "T" indicates transpose. The variance of $y_1$ is maximally large under the constraint that the norm of w, $\|w_1\|=1$. The weight vector maximizes the principal component criterion $J_1^{PCA}(w_1) = E\{y_1^2\} = E\{(w_1^T x)^2\} = w_1^T C w_1 \|w_1\| = 1$, where $E\{.\}$ is the expectation over the density of input vector x. The matrix C is the K×K covariance matrix defined by $C = E\{xx^T\}$. Note that the covariance matrix in our case is the co-occurrence matrix divided by the number of paragraphs in the base text. Subsequent principal components are $y_n = w_n^T x$, subject to the constraints that $\|w_1\|=1$ and $w_n^T w_m = 0$ for all m<n. This last constraint ensures that the w vectors are all orthonormal. Typically, N is substantially smaller than K, producing the data reduction and capturing the regularities in the word usage patterns. The network consists of K inputs corresponding to the K elements of the text vector and N linear neurons. The output of the nth neuron in response to input vector x is $y_n = w_n^T x$.

The identical transform can be accomplished using well-known statistical techniques. The network and statistical techniques differ only in the details of the algorithm by which the N principal components are computed, the results are identical. See Erkki Oja, *Principal Components, Minor Components, and Linear Neural Networks*, 5 NEURAL NETWORKS 927–35 (1992); Erkki Oja, Principal Component Analysis, in BRAIN THEORY AND NEURAL NETWORKS 753–56 (Michael A. Arbib ed., MIT Press, 1995). (The disclosure of these two references is hereby incorporated by reference as if fully set forth herein.)

There are several learning algorithms that can be used to train a neural network to extract the principal components of the covariance matrix. One of these is the Stochastic Gradient Ascent algorithm. See ERKKI OJA, SUBSPACE METHOD OF PATTERN RECOGNITION 49–50 (Research Studies Press & John Wiley publishers, 1983), hereby incorporated by reference as if fully set forth herein. The change in weight vector $w_n$ from time t−1 to time t is $\Delta w_n(t-1) = w_n(t) - w_n(t-1)$. This weight vector is updated according to the learning rule $$\Delta w_n(t-1) = \gamma(t) y_n(t) \left[ x(t) - y_n(t) w_n(t-1) - 2 \sum_{m<n} y_m(t) w_m(t-1) \right]$$

where $\gamma(t)$ is the learning rate parameter governing the speed of gradient ascent. Typically, these step sizes decrease slowly with time. The first term on the right is the Hebbian learning term $y_n x(t)$, and the remaining terms implement the orthonormality constraints. This general learning rule and others like it reflect what appears to be a significant brain mechanism as observed in experiments by Ambrose-Ingerson, Granger, and Lynch. See Jose Ambrose-Ingerson et al., *Simulation of Paleocortex Performs Hierarchical Clustering*, 247 SCIENCE 1344–48 (1990).

There are other techniques that can be used in place of principal components to project the high dimensional text vectors onto lower dimensional representations. These techniques are known in the statistical literature as matrix decomposition techniques. They differ somewhat in the constraints they place on the projected dimensions, but most of them would yield good results for information retrieval. The goal of using them is to find a basis set for a lower-dimensional representation of the data that preserves the nonredundant information in the original text vectors. These methods include projection pursuit, described in J. H. Friedman, *Exploratory Projection Pursuit*, 82 J. AM. STATISTICAL ASSOC. 249–66 (1987), the closely related independent component analysis, described in Pierre Comon, *Independent Component Analysis—a New Concept?*, 36 SIGNAL PROCESSING 287–314 (1994), and semi-discrete matrix decomposition as in Tamara G. Kolda & Dianne P. O'Leary, UNIVERSITY OF MARYLAND INSTITUTE FOR ADVANCED COMPUTER STUDIES, TECHNICAL REPORT CS-TR-4012, COMPUTATION AND USES OF THE SEMIDISCRETE MATRIX DECOMPOSITION (1999). (These three papers are hereby incorporated by reference as if fully set forth herein.)

The connection matrix w has K rows and N columns. Premultiplying the connection matrix by a text vector x yields the neural network activation pattern, which can be used as a semantic profile of the text vector $y_i = x_i^T w$. Furthermore, the input vector can be approximated by multiplying the activation vector or semantic profile by the transpose of the connection matrix $\hat{x} = y_i w^T$.

A query encoded into a text vector generates a semantic profile in the same way as the original text. This profile is a projection of the semantics of the query in the lower-dimensional basis space. Similar profiles can be obtained for documents by transforming the vocabulary in the document into a text vector and multiplying its transpose by the weight matrix. The relevance of the document to the query corresponds to the similarity in their semantic profiles, which can be assessed by taking the dot product of the query semantic profile and the document semantic profile. High products indicate high relatedness.

Alternatively, one can compare the estimated text vector (also called a result vector) $\hat{x}$ with each document's text vector and again measure relevance using the dot product of these vectors. Comparing the semantic profiles of queries against the semantic profiles of documents requires that a profile be computed for each of the documents in the document retrieval database. With N in the range of 300–1000 elements, this results in a compact way to store the semantic content of documents. That is, each document would be stored as, say, a vector of 1000 elements. Because most queries are extraordinarily sparse (because searchers enter so few search terms), however, it may be computationally more efficient to compute the result vector and compare a sparse representation of the terms in the document vector with a sparse representation of the result vector. The only documents that need to be evaluated are those containing the terms described by the result vector, so only a few multiplications are necessary for any given retrieval. There are tradeoffs for both representations and the method one uses depends on the storage requirements, the size of the document database, and the speed with which vector multiplications can be carried out (e.g., a vector processor may make it faster to process large numbers of vectors than to operate with sparse vector representations). More details of the sparse representation scheme will be given in the second embodiment described later. For the rest of this section we will assume that fast array processing is available and so we will focus on using the semantic profiles directly in an Internet search context. The same processes, of course, could be used to search any set of documents.

As described above, we use a web crawler and third-party search services to get the URLs for candidate documents to be included in our database. As a potential document is processed, it is transformed into a text vector x and passed through the neural network. The activation patterns of the units are saved as the semantic profile for the document and the result vector $\hat{x}$ is obtained. The cosine of the angle between x and $\hat{x}$ is computed. Those documents with cosines greater than a predetermined criterion (e.g., 0.39) are admitted to the database, the rest are discarded. For admitted documents we store the title, URL, profile, and a brief summary of the document.

Figure 6:
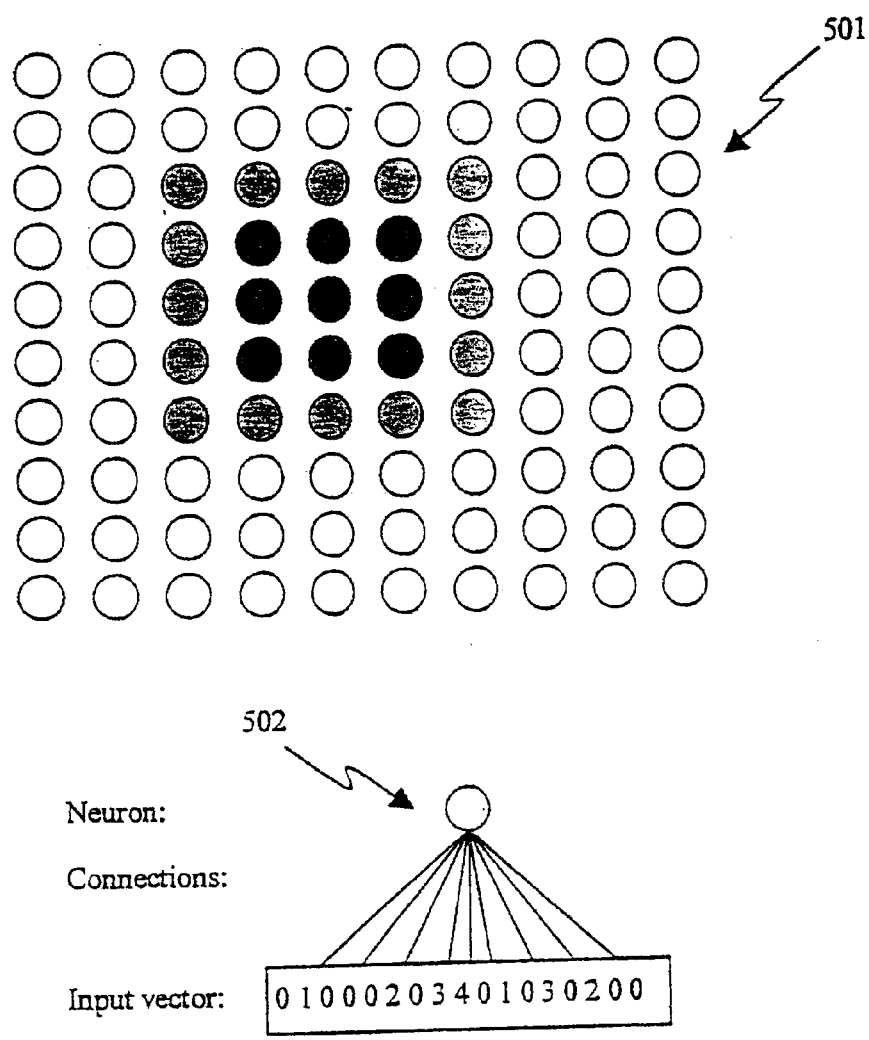
FIG. 6 shows a schematic of a Self Organizing Feature Map neural network used for clustering similar documents.

In order to minimize the computations necessary for search, the documents are organized into clusters using either Kohonen's self-organizing feature map neural networks (Kohonen, 1982, 1988) or K-means clustering. For example, we might use 144 clusters to store profiles of a million or more documents. The exact number is of course not critical. Self organizing maps, also called "topology preserving maps" because they preserve the topology of the similarity structure of the documents, begin with a two-dimensional sheet of neurons arranged in a grid (FIG. 6). Each neuron has weighted connections to each of the inputs in the semantic profile. Initially, the weights of these connections are randomized. As each of the profiles is presented to the network for learning, the dot product between the weight vector for each neuron and the profile vector is computed. The neuron with the highest dot product is called the winner. This neuron adjusts its weight vector to more closely approximate the profile vector that caused it to win. Its neighboring neurons also adjust their weights toward the profile vector, but by smaller amounts that decrease with increasing separation from the winning neuron. The neurons in the sheet come to represent the centroids of profile vector categories and nearby neurons come to represent nearby (in similarity space) clusters.

When the user enters a search query, the query terms are transformed into a text vector (the query vector), which is submitted to the neural network. The resulting profile is then compared with the centroids of each of the categories learned by the self-organizing map. One of these centroids will provide the best match to the query vector, so the patterns represented by that neuron are likely to be the best match for the query. The semantic profiles of the documents in this cluster are compared with the query vector and ranked in order of decreasing dot products, corresponding to decreasing relevance to the query. Typically only the documents from one cluster will have to be compared one by one to the query vector and the remaining documents in the database will not need to be examined. If too few documents are retrieved in this step (e.g., fewer than 50 that meet a minimum relevance requirement or fewer than the user requests), the next closest cluster will also be searched. Resulting documents will be returned to the user in the form of the URL, title, and summary (or including other information) in order of decreasing dot product magnitude.

Linear Pattern Associator Network Embodiment

The main difference between this embodiment and the one described above is the type of neural network employed. In this embodiment we use a different variation of the Hebbian learning rule to construct the network without the constraints enforcing orthonormality. According to the standard Hebbian learning algorithm, when two items occur together, the strength of the connection between them is increased by $w_{ij}(t+1) = w_{ij}(t) + \alpha F_i F_j$, where $w_{ij}(t)$ is the connection strength between element i and element j at time t. $F_i$ is the frequency of word i. We use a variant of this learning rule in which $w_{ij}(t+1) = w_{ij}(t) + \alpha F_i$ with the further constraint that $F_j$ cannot be greater than 255, and $F_i$ is either 1 or 0 depending on whether or not the $i^{th}$ word appeared in the corresponding paragraph. This learning rule increments the association between word i and the other words with which it appears without regard to the frequency of word i in the context. The maximum prevents total domination of the network by a small number of words and it allows the network to be stored in the form of 8-bit integers for substantial memory savings. The essence of this learning rule is a matrix in which the rows represent all of the unique words in the vocabulary and the columns represent the frequencies with which each other word appeared with that specific word. This representation is very simple, with additional nonlinearities typical of neural networks being incorporated elsewhere in the process, described later, for simplicity and speed of processing. This matrix is extremely sparse—most of its entries are 0's because many word pairs do not occur; it is stored on disk as a sparse matrix. As described, this matrix implements what is called a linear associator network (Kohonen, 1988).

In the linear associator network we can multiply the text vector x by the weight matrix w to produce the estimated or result vector x̂ because w is a K×K square matrix. As a result, we can compute the same relationships between query vectors and document vectors that we compute with the PCA network, but instead of using the orthonormal set of basis vectors we store the whole unreduced connection matrix. On balance, the sparseness of the linear associator matrix compensates for data reduction introduced by the basis vectors.

Candidate documents for the database are processed by parsing them into vectors similar to those derived from the basic text. Some of the words in a document are in the vocabulary being processed and some are not. Those words not in the vocabulary are counted, but are otherwise ignored. The frequency with which each word appears in the document is stored in a text vector. This vector is then submitted to the neural network and a result vector is obtained. A threshold is then calculated corresponding to nonlinear lateral inhibition in the neural network. It is computed on the output for mathematical convenience, but could equally well be done within the network. Only those items substantially above the mean are maintained, the others are set to 0. In doing this, we preserve the most important relations among the terms and neglect those relationships that are more idiosyncratic in the text. We typically set the threshold to be 2.5–3.5 times the standard deviation of the nonzero output vector elements. The specific value is not critical provided that it is substantially above the mean. The nonzero entries are then sorted into descending order of magnitude. The result vector x̂ represents the neural network's prediction of what the document should contain given the relationships it has learned from the original text. A close match between the submitted vector and the result vector indicates that the semantic relations present in the document are semantically close to the semantic relations present in the original text; the document is, therefore, relevant. Relatedness is computed using the cosine of the angle between the two vectors. Documents with cosines above 0.39 are maintained in the database, cosines below 0.39 are not processed further. This criterion was empirically determined.

An additional inclusion criterion that involves the ratio of vocabulary words to total words in the document can be used. Vocabulary words are those that are included in the base text dictionary. Ratios very far from 0.4 are anomalous and such documents can be discarded. Very high ratios indicate that the document being processed is very short and contains only a few words from the vocabulary making the determination of its true relevance difficult. Documents with very low ratios indicate that they are largely about other topics and so are irrelevant to the community's interests.

The remaining documents are further processed to form a database. The database consists of two parts—a table of word frequencies by document and a structure containing the identifying information about the documents including an ID/serial number, its URL, its title, and a summary of the document. In the PCA Network Embodiment we store the information about the document's content with the document identifier information. In this embodiment we store it as a separate table or matrix.

The word-by-document matrix has as many rows as there are elements in the text vectors, i.e., K. Each row corresponds to one word or word stem. The columns of the matrix, stored in sparse form, are the documents remaining in the database. Entries in the matrix are the frequencies with which each word occurred in each document, subject to the constraint that words that occur more than six times in the document are represented according to the formula $F_d=6+\log(C_i)$, where C is the actual count of the word frequency and log is the base-10 log function. These entries are then further transformed by dividing them by the log of the number of words in the document. Normalizing by document length in this way reduces the inherent bias for longer documents, which typically contain more examples of any particular word in the dictionary. These transformations are additional nonlinearities in the activation function of the network that could be implemented in the network matrix itself, but are more easily computed here. They prevent specific words from dominating the document while preserving the ordinal properties of occurrence frequencies.

Queries are processed by a two-stage mechanism. The first stage is started when the system is initially loaded. As many calculations as possible are processed during this stage in order to keep query response times to a minimum.

The first part of the initialization sequence loads the neural network, the word-to-index dictionary, and the word-by-document matrix. For each word we compute the number of pages that contain that word, Pw and use this number to compute a log inverse document frequency, idf, according to the formula $$w_i = \log\left(\frac{N_d}{P_w}\right),$$

where $w_i$ is the weight for word i, and Nd is the number of documents in the database. Words that occur in more pages receive lower weights than words that appear in fewer pages. Rare words are more selective than frequent words. This is a common technique in information retrieval systems.

Once the network is initialized, the user submits a query, which is stripped of stop words and extraneous nonalphabetic characters, and converted to lowercase. Words that are in the vocabulary cause the corresponding elements of the text vector to be set to 1. Words that are not in the vocabulary are submitted to the stemming algorithm. If a word form appeared in the text (e.g., "appears"), then it and its stem ("appear") would both have entries in the dictionary. Other forms of the word would not have dictionary entries (if they do not occur), and so if the user typed one of these forms (e.g., "appeared") into the query, it would not be automatically identified. By stemming, the novel form is translated into its stem and the search can continue. If neither the word nor its stem appears in the vocabulary, then a message is returned to the user indicating that the word is not in the vocabulary.

After stemming is complete, the elements of the query vector corresponding to the query terms are set to 1.0. The query vector is then submitted to the neural network and a result vector is produced. This result vector is modified when more than one search term is included in the query. A separate temporary vector is maintained which is the product of the initial result vector from each of the terms in the query. The idea here is to emphasize those terms that are common to the multiple search terms in order to emphasize the shared meaning of the terms. The effect of the multiplication is to "AND" the two vectors. For example, the two terms "mother" and "law" have in common the fact that they occur together in the context of family relations concerning mothers-in-law. (The word "in" is typically a stop word not included in processing). It is more likely that a query containing "mother" and "law" would be about mothers-in-law than about legal issues and maternity unless these specific relations were contained the text. This technique, as a result, allows the query terms to help disambiguate one another.

The signum of the nonzero terms of the temporary vector times a constant, typically 3, is added to the sum of the initial result vector. (The signum function returns −1 if the argument is less than 0, 0 if the argument is 0, and +1 if the argument is greater than 0). The result vector is then weighted by the log-idf values computed earlier for those terms and thresholded as described earlier to eliminate weakly related terms.

The elements of the result vector corresponding to the original search terms are then incremented to ensure that the original search terms play an important role in determining which documents are pertinent to the search. The entire resulting vector is then divided by its norm to normalize it.

Using shortcut matrix multiplication techniques, the result vector as transformed $\hat{x}$ is multiplied by the word-by-document matrix D. The result is a vector in which the elements correspond to the degree to which each document matches the weighted query, as described earlier. These values are then sorted and returned in order, e.g., 10 at a time, to the user along with the summary information recorded in the database (i.e., the URL, title, summary, etc.).

While the features of the invention have been described and illustrated with some specificity, it will be understood by those skilled in the art that changes in the above description or illustration may be made with respect to form or detail without departing from the spirit and scope of the invention.

APPENDIX A

Stop words:

| | | | |
|---|---|---|---|
| a | anything | but | elsewhere |
| about | approximately | by | end |
| above | are | c | ended |
| according | aren | can | ending |
| across | aren't | cannot | ends |
| actually | around | can't | enough |
| adj | as | co | especially |
| after | at | could | etc |
| afterwards | b | couldn | even |
| again | be | couldn't | evenly |
| against | became | d | ever |
| all | because | did | every |
| almost | become | didn | everyone |
| alone | becomes | didn't | everything |
| along | becoming | do | everywhere |
| also | been | does | except |
| although | before | does | f |
| always | beforehand | doesn | few |
| am | begin | doesn't | fewer |
| among | begins | done | followed |
| amongst | behind | don't | following |
| an | being | during | for |
| and | below | e | found |
| another | beside | each | founded |
| any | besides | eg | founding |
| anyhow | between | either | from |
| anyone | both | else | from |
| further | i | likely | must |
| further | ie | likes | my |
| furthering | if | ltd | n |
| g | in | m | namely |
| give | inc. | made | nearly |
| given | indeed | mainly | neither |

APPENDIX A
-continued

Stop words:

| | | | |
|---|---|---|---|
| gives | instead | make | next |
| giving | into | makes | no |
| h | is | making | nobody |
| had | isn | many | none |
| hardly | isn't | may | nonetheless |
| has | it | maybe | noone |
| hasn | its | me | nor |
| hasn't | itself | meanwhile | not |
| have | j | might | nothing |
| haven | just | min | now |
| haven't | k | miss | nowhere |
| having | kg | missed | o |
| he | km | misses | obtain |
| hence | l | missing | obtained |
| her | largely | ml | of |
| here | last | mm | off |
| hers | lasting | more | often |
| herself | later | moreover | on |
| him | least | most | once |
| himself | less | mostly | one |
| his | let | mr | ones |
| how | like | mrs | only |
| however | liked | much | onto |
| or | says | such | toward |
| other | seem | suggest | towards |
| others | seemed | suggested | u |
| otherwise | seeming | suggests | undone |
| our | seemingly | t | unless |
| ours | seems | taking | unlike |
| over | seen | than | unlikely |
| p | several | that | unseen |
| per | she | the | until |
| perhaps | should | their | upon |
| possible | shouldn | theirs | upon |
| previously | shouldn't | them | us |
| q | show | themselves | use |
| quite | showed | then | uses |
| r | showing | there | used |
| rather | shown | thereafter | using |
| re | shows | thereby | v |
| really | significant | therein | various |
| recent | significantly | these | ve |
| recently | since | they | very |
| redone | so | this | very |
| regarding | some | those | via |
| resuited | somehow | though | w |
| resulting | someone | through | was |
| reuse | something | thru | wasn |
| reusing | sometime | thus | we |
| s | sometimes | to | well |
| same | somewhere | together | were |
| say | still | too | weren |
| weren't | whereupon | why | you |
| what | wherever | will | your |
| whatever | whether | with | yours |
| when | which | within | yourself |
| whenever | while | without | yourselves |
| where | who | would | z |
| whereafter | whoever | wouldn | |
| whereas | whole | wouldn't | |
| whereas | whom | x | |
| whereby | whomever | y | |
| wherein | whose | yet | |

I claim:

1. A method for extracting a semantic profile from a text corpus, the method comprising the steps of:

parsing the text corpus into paragraphs and words;

processing the text corpus to remove stop words and inflectional morphemes;

arranging the vocabulary of the parsed and processed text corpus in an order;

creating a reference set of vectors from the text corpus by transforming each paragraph of the parsed and processed text corpus into a corresponding vector of K elements arranged in the order, K being the size of the vocabulary, each element of the vector corresponding to said each paragraph determined by application of a first predetermined function to the number of occurrences within said each paragraph of the word corresponding to said each element;

presenting the reference set of vectors to a neural network to train the neural network in the word relationships of the text corpus; and storing activation patterns of the hidden units of the trained neural network for use as the semantic profile of the text corpus.

2. A method for representing a document in terms of the document's semantic profile relative to the semantic profile of the text corpus derived in claim 1, the method comprising the steps of:

parsing the document into word units;

processing the document to remove inflectional morphemes;

transforming the parsed and processed document into a text vector of K elements arranged in the order, each element of the text vector determined by application of a second predetermined function to the number of occurrences within said parsed and processed document of the word corresponding to said each element;

presenting the text vector to the trained neural network for processing; and storing the resulting hidden unit activation patterns of the trained neural network after the processing of the text vector as the document's semantic profile.

3. A method for determining whether the document represented in terms of the document's semantic profile as in claim 2 is relevant to the text corpus, the method comprising the steps of:

applying a first relevance criterion to the document's semantic profile;

excluding the document from a database of relevant documents if the document fails the first relevance criterion; and storing an identifier and a summary of the document if the document passes the first relevance criterion.

4. A method according to claim 3, wherein the step of applying the first relevance criterion further includes the steps of:

calculating a normalized inner product between the text vector and the output of the trained neural network resulting from processing the text vector; and comparing the normalized inner product to a first empirically determined threshold;

wherein the normalized inner product being less than the first empirically determined threshold signifies failing the first relevance criterion.

5. A method according to claim 3, wherein the application of said second predetermined function to the number of occurrences within said parsed and processed document of the word corresponding to said each element includes weighting the number of occurrences by the inverse length of the document and by an inverse document frequency.

6. A method according to claim 3, wherein the step of applying the first relevance criterion further includes the steps of:

counting the total number of words in the parsed and processed document; and comparing the total number of words to a second threshold;

wherein the total number of words being more than the second threshold signifies failing the first relevance criterion.

7. A method according to claim 6, wherein said second threshold is approximately 250,000 words.

8. A method according to claim 3, wherein the step of applying the first relevance criterion further includes the steps of:

counting m, m being the number of words in the parsed and processed document that are also in the vocabulary;

counting n, n being the number of words in the parsed and processed document;

$$\text{calculating } r = \frac{m}{n-m};$$

and comparing r to a first empirically determined range;

wherein r being outside of the first empirically determined range signifies failing the first relevance criterion.

9. A method for building a contextual semantic space of a set of documents in terms of semantic profiles of the documents in the set relative to the semantic profile of the text corpus derived according to claim 1, the method comprising the steps of:

parsing each document into word units;

processing said each document to remove inflectional morphemes;

transforming said each parsed and processed document into a text vector of K elements arranged in the order, each element of said each document's text vector determined by application of a second predetermined function to the number of occurrences within said each parsed and processed document of the word corresponding to said each element;

presenting each text vector to the trained neural network for processing; and storing resulting hidden unit activation patterns of the trained neural network after the processing of said each text vector as said each document's semantic profile.

10. A method for clustering semantic profiles of the documents of the set within the contextual semantic space built according to claim 9, the method comprising the step of organizing the stored semantic profiles of the documents into clusters within the contextual semantic space.

11. A method according to claim 10, wherein said organizing step comprises the step of using a self-organizing feature map neural network.

12. A method according to claim 10, wherein said organizing step comprises the step of using K-means clustering statistical procedure.

13. A method for clustering semantic profiles of the documents of the set within the contextual semantic space built according to claim 9, the method comprising the step for clustering the stored semantic profiles of the documents within the contextual semantic space.

14. A method for ranking, by relevance to a query, the documents with semantic profiles clustered in accordance with claim 13, the method comprising the steps of:

parsing the query into word units;

processing the query to remove inflectional morphemes;

transforming the parsed and processed query into a query text vector of K elements arranged in the order, each element of the query text vector determined by application of a third predetermined function to the number of occurrences within said parsed and processed query of the word corresponding to said each element of the query text vector;

presenting the query text vector to the trained neural network for processing;

storing the resulting hidden unit activation patterns of the trained neural network after the processing of the query text vector as the query semantic profile;

determining centroids of the clusters;

comparing the query semantic profile to the centroids;

identifying a first cluster having a first centroid that is similar to the query semantic profile; and comparing semantic profiles of documents belonging to the first cluster with the query semantic profile to rank the documents belonging to the cluster by relevance to the query.

15. A method according to claim 14, wherein said comparing step comprises the steps of:

calculating a normalized inner product between the query semantic profile and semantic profile of each document in the first cluster; and ranking said each document in the first cluster according to the calculated normalized inner product corresponding to said each document in the first cluster.

16. A method according to claim 14, further comprising the step of applying a second relevance criterion to the ranked documents.

17. A method for ranking, by relevance to a query, the documents with semantic profiles clustered in accordance with claim 10, and for selecting j of the ranked documents, j being a first predetermined number, the method comprising the steps of:

parsing the query into word units;

processing the query to remove inflectional morphemes;

transforming the parsed and processed query into a query text vector of K elements arranged in the order, each element of the query text vector determined by application of a third predetermined function to the number of occurrences within said parsed and processed query of the word corresponding to said each element of the query text vector;

presenting the query text vector to the trained neural network for processing;

storing the resulting hidden unit activation patterns of the trained neural network after the processing of the query text vector as the query semantic profile;

determining centroids of the clusters;

comparing the query semantic profile to the centroids;

identifying a first cluster having a first centroid that is similar to the query semantic profile;

comparing semantic profiles of documents belonging to the first cluster with the query semantic profile to rank the documents belonging to the first cluster by relevance to the query;

applying a second relevance criterion to the ranked documents belonging to the first cluster;

if fewer than j documents pass the second relevance criterion, identifying a second cluster having a second centroid that is similar to the query semantic profile;

comparing semantic profiles of documents belonging to the second cluster with the query semantic profile to rank the documents belonging to the second cluster by relevance to the query;

applying the second relevance criterion to the ranked documents belonging to the second cluster; and selecting j documents from the ranked documents that passed the second relevance criterion.

18. A system for ranking of documents by relevance to a query within a context defined by a text corpus, the system comprising:

means for parsing the text corpus into paragraphs and words;

means for arranging the vocabulary of the parsed text corpus in an order;

means for creating a reference set of vectors from the text corpus by transforming each paragraph of the parsed text corpus into a corresponding vector of K elements arranged in the order, K being the size of the vocabulary, each element of the vector corresponding to said each paragraph determined by application of a first predetermined function to the number of occurrences within said each paragraph of the word corresponding to said each element;

a neural network;

means for presenting the reference set of vectors to the neural network to train the neural network in the word relationships of the text corpus;

means for retrieving and storing activation patterns of the hidden units of the trained neural network for use as a semantic profile of the text corpus;

means for parsing each document into word units;

means for transforming said each parsed document into a text vector of K elements arranged in the order, each element of said each document's text vector determined by application of a second predetermined function to the number of occurrences within said each parsed document of the word corresponding to said each element;

means for presenting each text vector to the trained neural network for processing;

means for retrieving and storing a semantic profile of said each document, said semantic profile of said each document being hidden unit activation patterns of the trained neural network resulting from the processing of said each text vector;

means for organizing stored semantic profiles of the documents into clusters;

means for determining centroids of the clusters;

means for parsing the query into word units;

means for transforming the parsed query into a query text vector of K elements arranged in the order, each element of the query text vector determined by application of a third predetermined function to the number of occurrences within said parsed query of the word corresponding to said each element of the query text vector;

means for presenting the query text vector to the trained neural network for processing;

means for retrieving and storing a query semantic profile, the query semantic profile being hidden unit activation patterns of the trained neural network resulting from the processing of the query text vector;

means for comparing the query semantic profile to the centroids;

means for identifying a first cluster having a first centroid that is similar to the query semantic profile; and means for comparing semantic profiles of documents belonging to the first cluster with the query semantic profile to rank the documents belonging to the first cluster by relevance to the query.

* * * * *